Figure 10:
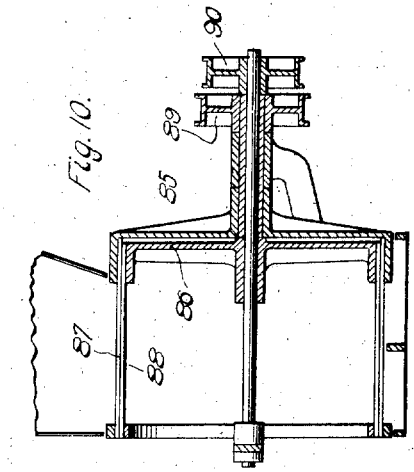

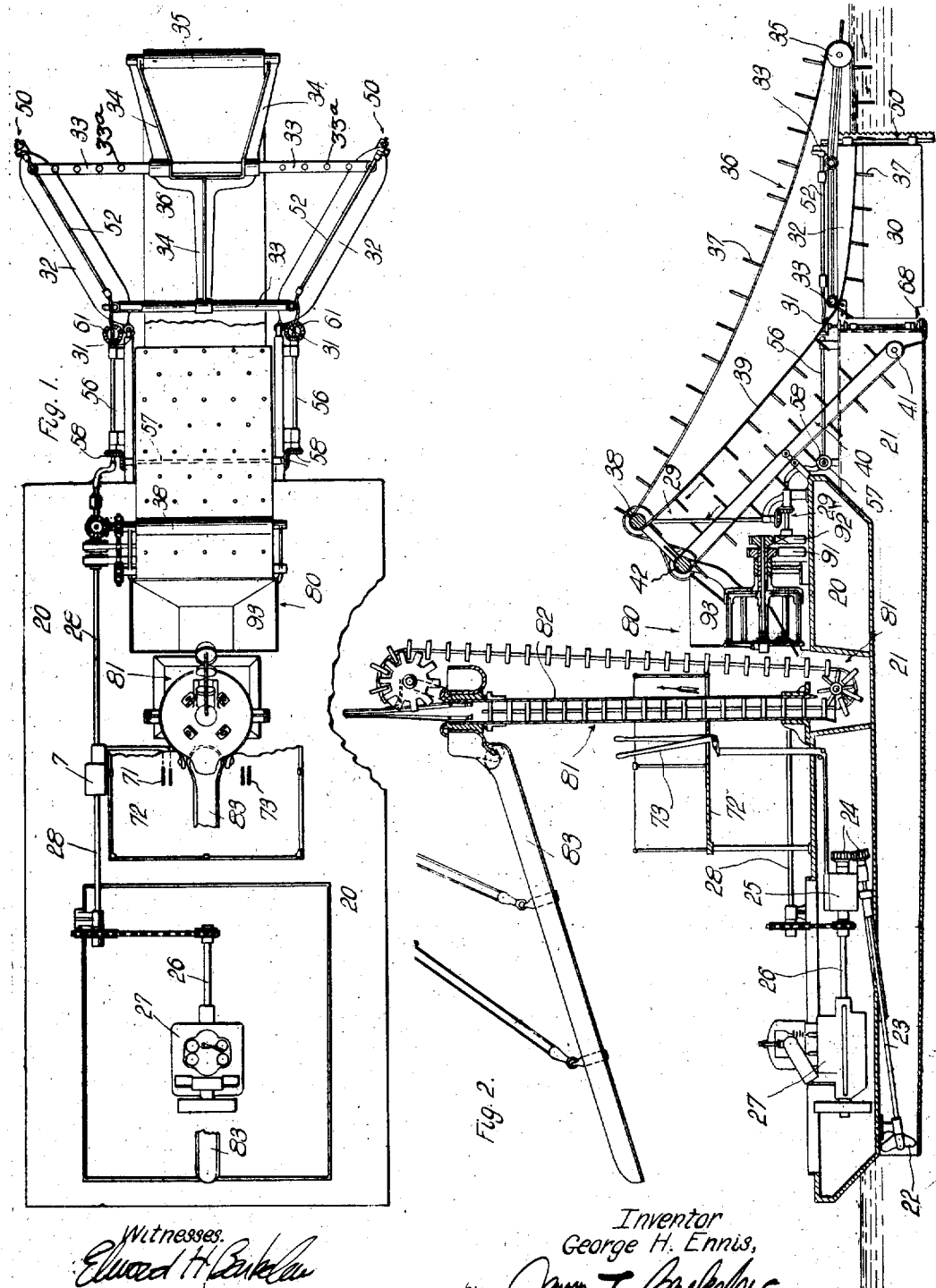

G. H. ENNIS.
SEAWEED HARVESTER.
APPLICATION FILED DEC. 7, 1912.

1,080,144.

Patented Dec. 2, 1913.
3 SHEETS—SHEET 2.

Witnesses.
Thomas Bradley
Edward H. Batcheller

Inventor,
George H. Ennis,
by James T. Batcheller
his Attorney.

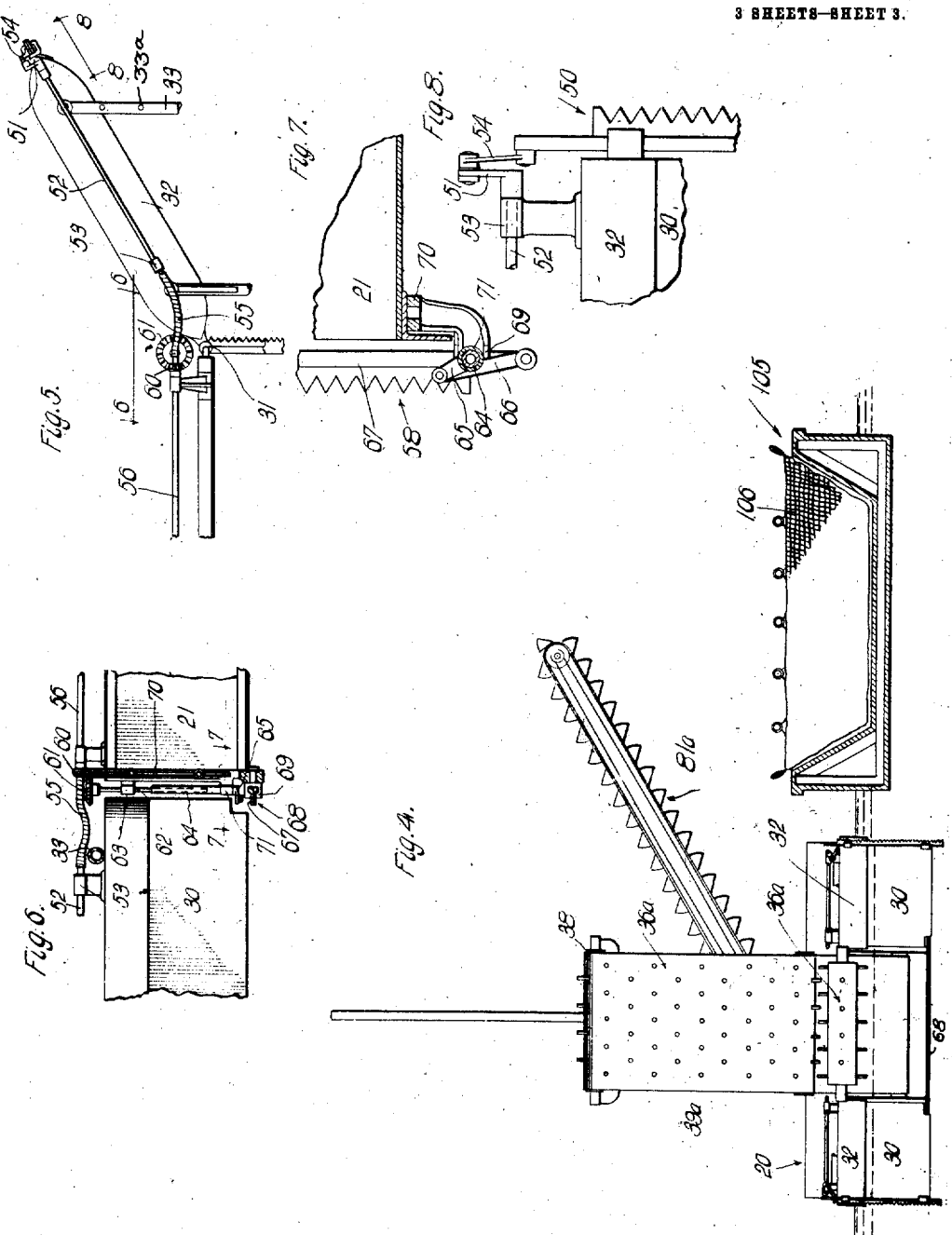

UNITED STATES PATENT OFFICE.

GEORGE H. ENNIS, OF LOS ANGELES, CALIFORNIA.

SEAWEED-HARVESTER.

1,080,144.  Specification of Letters Patent.  Patented Dec. 2, 1913.

Application filed December 7, 1912. Serial No. 735,353.

*To all whom it may concern:*

Be it known that I, GEORGE H. ENNIS, a citizen of the United States, residing at Los Angeles, in the county of Los Angeles, State of California, have invented new and useful Improvements in Seaweed-Harvesters, of which the following is a specification.

This invention relates to device and apparatus for cutting and harvesting sea weed or kelp, for cutting it at a suitable distance below the water surface, removing it from the water, and hoisting it on board a float and then suitably delivering the kelp to barges or other carrier alongside.

The immediate and prime object of this invention is the provision of a machine by means of which large quantities of sea weed may be gathered and handled at a minimum expense.

There are other minor objects, as adaptation to varying conditions; but efficiency in gathering the sea weed is the prime consideration.

As I now consider it, my invention consists broadly in the combination of a suitable floating support, a cutting mechanism submerged so as to cut out portions of the floating sea weed, and gathering mechanisms which gather the sea weed from the surface, draw it toward the float and enable it to be hoisted aboard for immediate delivery to barges or for other intermediate operations such as cutting, grinding or crushing, etc. The operations which may be carried on at the float may vary with the character of sea weed being handled and with the use to which the product is finally put. Within this broad conception I have preferred a form in which I utilize a floating support with divergent submerged guides extending forwardly therefrom for guiding and gathering the sea weed toward the float. I place vertical cutters on the forward edges of the guides, these cutters extending downwardly as far as it may be desired to cut the sea weed; and a horizontal cutter I place at the rear ends of the guides so that it will cut the upwardly extending stems of all sea weed between the two guides. I preferably provide the float with a propelling apparatus and with a propeller crank extending forwardly from the propeller and terminating immediately behind the rear or convergent ends of the guides. The current created by the propeller causes the water to flow rearwardly through the tunnel between the guides; and this rearwardly flowing current is sufficient to overcome what tendency there would otherwise be for the bow-wave of the float to push the sea weed aside as the float advances; and it will prevent the sea weed being pushed below the surface by the barge and its attached mechanism. I also may use a conveyer mechanism which will extend over the water surface between the guides, and preferably extend a distance ahead of them, this conveyer operating to draw the surface sea weed rearwardly between the guides. The hoisting conveyer is placed so that it extends across the propeller tunnel diagonally upwardly and rearwardly to a point above the float. This conveyer is of such construction as to catch all the sea weed which is drawn in by the propeller current, allowing the water to pass on through the tunnel.

In the matter of motive power for the complete machine, I may use a separate motor for driving the propeller and for driving the conveying and sea weed handling mechanism; but I may also use a single motor for all of these operations. However, I do not care to limit myself to a float having its own propelling power; as the fundamentals of my invention may be incorporated into a harvester which is moved by some extraneous means, say a tug.

I have illustrated preferred forms of the apparatus in the accompanying drawings, in which—

Figure 9:
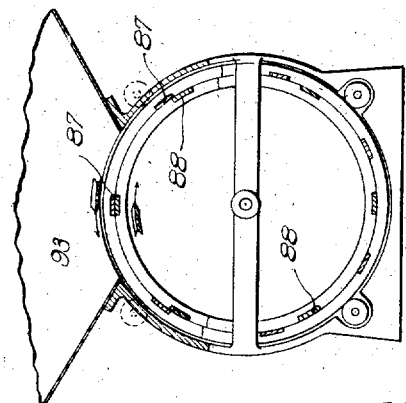
Figure 3:
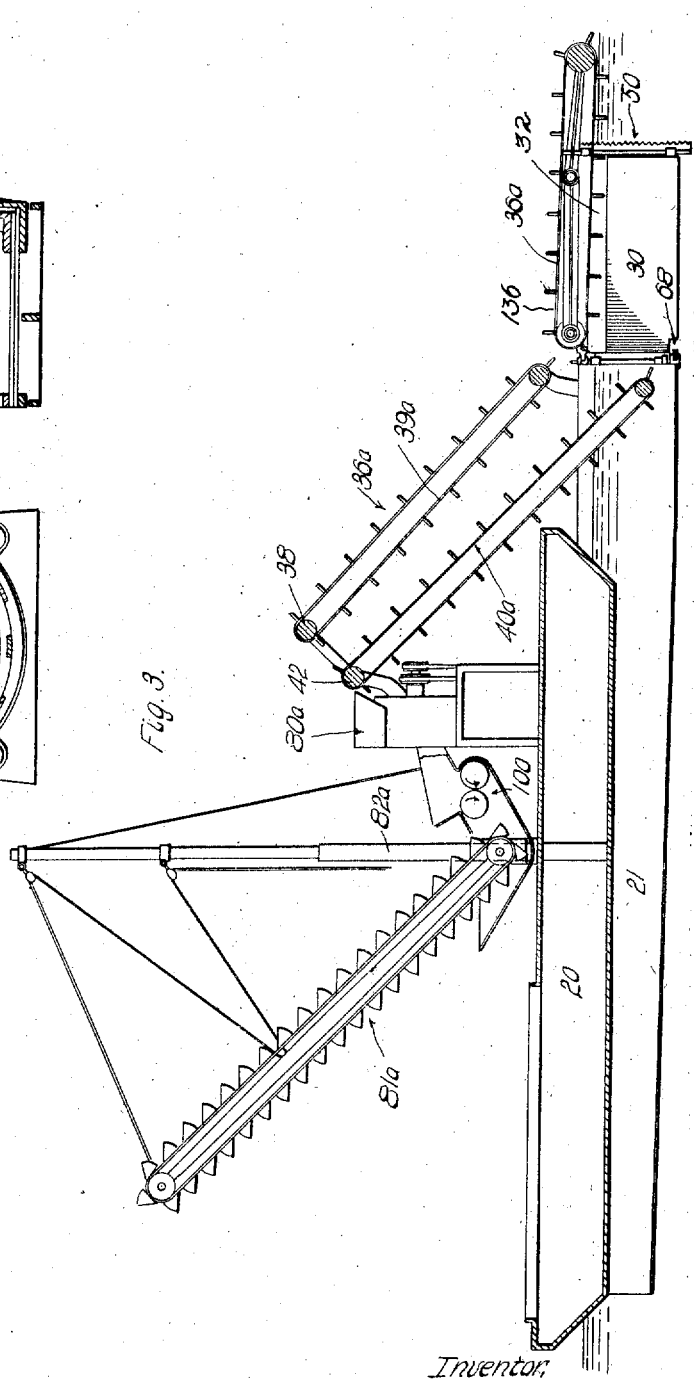

Figure 1 is a plan view of a preferred form. Fig. 2 is a longitudinal vertical section of the same. Fig. 3 is a similar longitudinal vertical section of a slightly modified form of device, adapted especially for use under water. Fig. 4 is a front elevation of my apparatus, showing a barge alongside about to be filled with sea weed. Fig. 5 is an enlargement of the right hand upper portion of Fig. No. 1. Fig. 6 is a view taken as indicated by line 6—6 of Fig. 5. Fig. 7 is a view taken as indicated by line 7—7 of Fig. 6. Fig. 8 is a view taken as indicated by line 8—8 of Fig. 5. Fig. 9 is a section showing a preferred form of cutting mechanism. Fig. 10 is a longitudinal section of the same.

In the drawings I have shown at 20 a suitable barge which may be of any convenient proportions and size. This barge I preferably provide with a propeller tunnel 21, and propeller 22 is arranged to operate at the rear end of the tunnel so as to create a rearwardly flowing current therethrough. The propeller may be driven by its shaft 23 having gearing connections 24 with a clutch and change gear mechanism 25 which derives its power from engine shaft 26. A suitable engine 27 may be provided; and I have shown the engine arranged rearwardly on the float to balance the weight of the mechanism arranged forwardly thereon. The engine shaft 26 may be connected to a shaft 28 through which power is transmitted to the various sea weed handling mechanisms; or the shaft 28, or its equivalent, may be operated from a separate motor.

The tunnel 21 extends forwardly preferably to a point forward of the prow of the float, and vertical submerged guides 30 are pivotally attached at 31 to the forward edges of the tunnel construction. The submerged guides 30 may include pontoons or suitable floats 32 for supporting the guides and the other mechanisms attached to the forward portions of the apparatus. The pontoons 32 may be adjustable in position, so that they may be spread apart so as to include wide area for the guides 30, or so that they may be moved to decrease the water resistance when the float is being moved to and from its first position. The pontoons 32 may be spaced apart by suitable spacers, which may be in the form of tubes or pipes 33 with a number of holes 33ª for adjustment of the distance between the forward ends of the pontoons; and on these pipes 33 I may secure the frame 34 carrying a roller or other suitable device 35 over which the conveyer 36 travels. This conveyer 36 may be of any suitable type, such as a belt with prongs 37 thereon and it may operate as is shown in Fig. 2 or through a shorter distance as is shown in Fig. 3. In the form shown in Fig. 2, the conveyer 36 extends rearwardly and upwardly over a suitable roller 38 above the float; and its portion 39 practically parallels the conveyer 40 and, with this conveyer, forms a hoisting apparatus for the sea weed. The conveyer 40 extends diagonally, as shown in Fig. 2, over the rollers 41 and 42 at the bottom and top. The conveyer 40 practically extends across the whole of the tunnel 21 so as to catch all the sea weed which is being drawn rearwardly by the action of the current in the tunnel; and, the conveyers 36 and 40 operating in the direction indicated by the arrows, the sea weed is gathered in between them and is discharged at their upper ends. The horizontal portion of the conveyer 36 operates close to the surface of the water between the guides 30 and forwardly thereof, so as to drag rearwardly into the machine all the sea weed which it can reach; and, in dragging the sea weed rearwardly, it will drag a certain amount of sea weed in from each side before it is cut by the vertical cutters. The vertical cutters are mounted on the forward edges of the guides 30, and are preferably of the double bladed toothed type common to mowers and the like. One or both blades of these cutters may be reciprocated; but it is sufficient to reciprocate one of the blades. Reciprocation is effected by means of a crank 51 on the forward end of a shaft 52 which is mounted in bearings 53 on the pontoon 32. A connecting rod 54 connects the crank with one of the blades of the cutter; and rotation of the shaft 52 will cause reciprocation of that blade. The shaft 52 is connected by the flexible means 55 with a shaft 56 which is in turn connected with and driven by shaft 28. The two shafts 56, one on each side of the mechanism, are connected together by a connecting shaft 57 with gears 58. One of the shafts 56 has a small gear 60 which meshes with a gear 61 on a vertical shaft 62 leading downwardly near the front edge of the tunnel 21. This shaft 62 extends downwardly through suitable bearing 63 and slidably connects with a hollow shaft 64 the construction being such that the crank 65 on the lower end of the hollow shaft 64 may be raised and lowered. The crank 65 has a connecting rod 66 connecting with one blade 67 of the horizontal cutter 68. This horizontal cutter is mounted in suitable blocks 69 which are swivelly mounted on vertically adjustable frames 70. Frame 70 also carries bearing 71 for the shaft 64; so that the cutter 68 and its operating mechanism may be raised and lowered to suit tidal conditions and to reach the distance below the surface at which the kelp stems must be cut. The vertical cutters may be extended downwardly into the water by merely lengthening or shortening them.

Horizontal cutter 68 extends across the space between the rear ends of the guides 30 at the forward end of the lower part of tunnel 21, being adjusted upwardly and downwardly as occasion may demand.

The conveyers 36 and 40 are driven by suitable connections to rollers 38 and 42 from the shaft 28. This may be effected through the medium of gearing connections 29, the rollers being so rotatively connected that they rotate in opposite directions to operate the conveyers as indicated. The shaft 28 may have a clutch and change gear mechanism 7 so that the speed of operation of the various cutters and conveyers may be changed as desired. This change gear mechanism may be operated by means of levers 71 on the controlling platform 72; and the mechanism 25 hereinbefore referred to may be operated through the levers 73.

I will now explain the general method of operation of my device, describing subsequently the operation of the devices for handling the sea-weed after it is delivered upon the float.

Through the use of the various change gears the relative speeds of the float in the water and of operation of the cutters and conveyers may be varied to suit conditions. If the kelp is relatively thick and heavy, the propeller will be rotated at slow speed ahead and the cutting and conveying apparatus will be operated at a relatively high speed to handle a large amount of material. When the kelp is relatively thin, the float may be moved forward more rapidly and the cutting and conveying mechanism operated relatively slower. It is desirable that the full power of the engine be used at all times; and this may be approximately effected by proper relating of the forward speed of the boat and the speed of the conveyers. As the float works forwardly, a constant flow or current of water is created rearwardly through the space between the guides 30 and through the tunnel 21. This rearward flow of water tends to draw the kelp toward the float as well as to propel the float forwardly. It is a disadvantage inherent in an ordinary float that its propelling mechanism will either propel it over the kelp or will cause the kelp to move away laterally from it to some extent. My construction avoids this difficulty and, in addition, positively draws the kelp toward the float. At the same time the conveyer 36 is operating upon the kelp at the surface to draw it into the space between the guides 30 and into contact with the vertical cutters. Not only does this conveyer draw the kelp toward the float; but it has a certain effect in drawing the float toward the kelp. At the same time that the kelp is drawn toward the float, a certain amount of it is drawn in from each side, as the kelp is usually matted together at the surface and pulls apart with some difficulty. The surface mat is drawn into contact with the vertical knives with the result that the knives make two vertical cuts through the kelp at a distance from each other dependent upon the amount of kelp the apparatus is capable of handling. In practice I propose to make these cuts considerable distance apart so that a large amount of kelp may be gathered in a single swath or cut. The kelp which is severed from the surrounding bed is drawn rearwardly between the guides 30 (or it might be said that the float moves toward the kelp and moves the guides 30 into the cut made by the vertical cutters) and the stems of the kelp come into contact with the horizontal knife and are severed. Immediately the stems are severed the kelp is engaged by the conveyer 40 and the conveyers 36 and 40 then carry the kelp to their upper ends where it is discharged into suitable apparatus for handling and distributing it to barges alongside.

There are many possible means of handling the kelp after it has been lifted from the water; but the prime object of all means of handling is to rid the kelp of all unnecessary weight so that the valuable material to be handled is as small in weight as possible. Where it is desired to save the whole of the kelp substance I prefer to cut the kelp into relatively small pieces and to then convey the whole mass of pulp into barges alongside. But where it is only desired to save the solid matter of the kelp, I may provide for crushing and removal of a large percentage of the liquid, then handling the kelp in its comparatively dry state. As shown in Figs. 1 and 2, the combination includes a suitable cutter 80 which receives the discharge from the conveyer 40 and which discharges into a suitable endless chain conveyer 81 to lift the pulp up through a hollow mast 82 and discharge it into a delivery spout 83. This delivery spout may be swung to any suitable position to discharge into a barge or other vessel.

The conveyer 81 and discharge spout 83 are of common construction and need no particular explanation; and I may use any kind of a cutter 80 suitable for cutting the kelp into small pieces. I have shown in Figs. 9 and 10 a form of cutter which I may prefer, consisting of two members 85 and 86 rotating in opposite directions and carrying knives 87 and 88 which pass each other at various points and sever the sea weed by shearing action. The members 85 and 86 may be rotated in opposite directions by means of pulleys 89 and 90 driven by suitable belt connections 91 and 92 from the shaft 28 (a belt connection, or equivalent friction device) is preferred as it will allow a certain slip to take place if any foreign matter (floating wood, etc.) should enter the cutter. I have placed the control platform so that the operator may watch for such matter and remove it at the hopper 93 before entry to the cutter. I may either have the knives 87 and 88 different in number or I may drive the two rotating parts at different speeds; or both, the effect of these arrangements being that the knives do not meet always at the same point in the opening of hopper 93, and thus cut the kelp uniformly over that opening.

I have shown a somewhat modified form of construction in Figs. 3 and 4, wherein I may provide, between the cutter 80$^1$ and the conveying mechanism 81$^a$ a suitable set of crushing rollers 100 which will crush the kelp and release a large part of the liquid therein. The liquid may be allowed to escape or may be collected in any suitable manner and the pulp may be elevated by a suitable elevator 81$^a$ and discharged over a barge 105 as is best shown in Fig. 4. This barge may be of any ordinary construction, preferably with a maximum cargo capacity; and I may provide a suitable net 106 into which the sea weed is delivered and by means of which it may be lifted easily from the barge when carried to its destination. The net has the advantage of releasing all of the superfluous mechanically held water and of retaining all of the sea weed for removal from the barge at one single and simple operation. The barge may be towed by a tug; in practice I contemplate the towing of a string of barges by a single tug.

The modifications indicated in Figs. 3 and 4 include mainly the use of the crushing rolls just described and of a bucket conveyer 81ª supported from the mast 82ª. This conveyer may be of the ordinary bucket chain type. I have also shown the conveyer belt 36ª formed in two separate parts; the portion 39ª coöperating with the belt 40ª to raise the seaweed and the portion 136 acting over the surface of the water to draw in the seaweed as before described.

It is on the general features of the apparatus that I base the following claims, wishing not to restrict myself to the various minor details shown and explained, but to have a full advantage of equivalents which may be substituted.

Having described my invention I claim:

1. Apparatus for harvesting sea weed and the like, comprising a floating support, submerged propulsion means therefor, submerged cutters spaced thereon, and means coöperating with said propulsion means for directing the water current caused by said propulsion means between said cutters for drawing the sea weed toward the cutters and floating support.

2. Apparatus for harvesting sea weed and the like, comprising a floating support, cutting apparatus thereon comprising a pair of vertical cutters arranged in front of the support, adjustable means for spacing said vertical cutters apart, a horizontal cutter arranged approximately in the horizontal plane of the lower ends of the vertical cutters, converging guides leading rearwardly from the cutters toward the floating support, and means for lifting the cut and gathered sea weed onto the support.

3. Apparatus for harvesting sea weed and the like, comprising a floating support, cutting apparatus thereon comprising a pair of vertical cutters arranged in front of the support and separated laterally by a considerable distance, and a horizontal cutter arranged approximately in the horizontal plane of the lower ends of the vertical cutters and behind the same, converging guides leading rearwardly from the cutters toward the floating support to the horizontal cutter, and means for lifting the cut and gathered sea weed onto the support.

4. Apparatus for harvesting sea weed and the like, comprising a floating support, cutting apparatus thereon comprising a pair of vertical cutters arranged in front of the support and separated laterally by a considerable distance, converging guides leading rearwardly from the cutters toward the floating support, a horizontal cutter arranged rearwardly of the vertical cutters and approximately in the horizontal plane of their lower ends, said horizontal cutter being at the rear ends of the converging guides, means for drawing the sea weed between the guides and toward the cutters and floating support, and means for lifting the cut and gathered sea weed onto the support.

5. Apparatus for harvesting sea weed and the like, comprising a floating support, cutting apparatus thereon comprising a pair of vertical cutters arranged in front of the support and separated laterally by a considerable distance, and a horizontal cutter arranged approximately in the horizontal plane of the lower ends of the vertical cutters, converging guides leading rearwardly from the cutters toward the floating support to the horizontal cutters, means acting over the water surface forwardly of the vertical cutters for drawing the sea weed between the guides and toward the cutters and floating support, and means for lifting the cut and gathered sea weed onto the support.

6. Apparatus for harvesting sea weed and the like, comprising a suitable floating support, diverging guides extending forwardly port to the horizontal cutter, means acting ward ends of the guides, a horizontal cutter at the rear ends of the guides and means acting over the water surface forwardly of the vertical cutters to draw the sea weed between the guides and toward the float.

7. Apparatus for harvesting sea weed and the like, comprising a suitable floating support, divergent guides extending forwardly from the float, means for adjusting the divergence of said guides, vertical cutters at the forward ends of the guides, a horizontal cutter at the rear ends of the guides and means to draw the sea weed between the guides and toward the float.

8. Apparatus for harvesting sea weed and the like, comprising a suitable floating support, diverging guides extending forwardly from the float, vertical cutters at the forward ends of the guides, a horizontal cutter at the rear ends of the guides, submerged propulsion means for the float, and means coöperating therewith to direct the water current caused by said propulsion means between said guides to draw the sea weed between the guides against the cutters and toward the float.

9. Apparatus for harvesting sea weed and the like, comprising a suitable floating support, diverging guides extending forwardly from the float, a vertical submerged cutter at the forward end of each guide, a horizontal submerged cutter at the rear of the guides approximately in the horizontal plane of the lower ends of the vertical cutters, means acting between the guides and forwardly thereof to draw floating sea weed between the guides toward the float, and a conveyer to hoist the sea weed upon the float.

10. Apparatus for harvesting sea weed and the like, comprising a suitable floating support, diverging guides extending forwardly from the float, a vertical submerged cutter at the forward end of each guide, a horizontal submerged cutter at the rear of the guides, propulsion means for the float, means coöperating with the propulsion means to direct the water current caused by said propulsion means between the guides to draw the floating sea weed between the guides toward the float, and a conveyer to hoist the sea weed upon the float.

11. Apparatus for harvesting sea weed and the like, comprising a suitable floating support, a propeller tunnel extending fore and aft thereunder, a propeller within the tunnel and motive power therefor, diverging submerged guides extending forwardly from each side of the tunnel, a vertical cutter at the forward end of each guide, a submerged horizontal cutter at the lower forward end of the tunnel, a conveyer extending diagonally upwardly across the tunnel and to a point over the float, and means for causing the operation of the cutters and the conveyer.

12. Apparatus for harvesting sea weed and the like, comprising a suitable floating support, a propeller tunnel extending fore and aft thereunder, a propeller within the tunnel and motive power therefor, diverging submerged guides extending forwardly from each side of the tunnel, a vertical cutter at the forward end of each guide, a submerged horizontal cutter at the lower forward end of the tunnel, conveyer means for lifting the sea weed onto the float, a cutting mechanism on the float receiving the discharge of the conveyer, and conveyer delivering apparatus receiving the cut material from the cutting mechanism.

13. Apparatus for harvesting sea weed and the like, comprising a suitable floating support, a propeller tunnel extending fore and aft thereunder, a propeller within the tunnel and motive power therefor, diverging submerged guides extending forwardly from each side of the tunnel, a vertical cutter at the forward end of each guide, a submerged horizontal cutter at the lower forward end of the tunnel, conveyer means operating over the water surface between the guides to draw floating sea weed rearwardly, and cutting mechanism on the float receiving the seaweed from the conveyer.

14. Apparatus for harvesting sea weed and the like, comprising a suitable floating support, a propeller tunnel extending fore and aft thereunder, a propeller within the tunnel and motive power therefor, divergent submerged guides extending forwardly from each side of the tunnel, a vertical cutter at the forward end of each guide, a submerged horizontal cutter at the lower forward end of the tunnel, conveyer means operating over the water surface between the guides to draw floating sea weed rearwardly, a conveyer extending diagonally upwardly across the tunnel and to a point over the float, and means for causing the operation of the cutters and conveyer.

15. Apparatus for harvesting sea weed and the like, comprising a suitable floating support, a propeller tunnel extending fore and aft thereunder, a propeller within the tunnel and motive power therefor, divergent submerged guides extending forwardly from each side of the tunnel, a vertical cutter at the forward end of each guide, a submerged horizontal cutter at the lower forward end of the tunnel, conveyer means operating over the water surface between the guides to draw floating sea weed rearwardly, said conveyer means extending out forwardly of the vertical cutters so as to draw the sea weed in toward the cutters, a hoisting conveyer extending diagonally upwardly across the tunnel and to a point over the float, and means for causing the operation of the cutters and conveyer.

16. Apparatus for harvesting sea weed and the like, comprising a suitable floating support, a propeller tunnel extending fore and aft thereunder, a propeller within the tunnel and motive power therefor, divergent submerged guides extending forwardly from each side of the tunnel, a vertical cutter at the forward end of each guide, a submerged horizontal cutter at the lower forward end of the tunnel, conveyer means operating over the water surface between the guides to draw floating sea weed rearwardly, said conveyer means extending out forwardly of the vertical cutters so as to draw the sea weed in toward the cutters, a conveyer extending diagonally upwardly across the tunnel and to a point over the float, and means for causing the operation of the cutters and conveyer, the arrangement being such that the suction of the propeller draws the sea weed through the space between the guides toward the horizontal cutter and the hoisting conveyer.

17. Apparatus for harvesting sea weed and the like, comprising a floating support, a propeller tunnel thereunder, a propeller in said tunnel, vertical and horizontal cutters at the forward end of said tunnel at each side and at the bottom of said tunnel, and conveyer means operating at the forward end of said tunnel rearward of the cutters to lift cut sea weed onto the floating support.

18. Apparatus for harvesting sea weed and the like, comprising a floating support, floating guides at the forward end of the support, pivotal connecting means between the guides and support, vertical cutters at the forward ends of the floating guides, a horizontal cutter at the rear lower edges of the floating guides, and means for lifting the cut sea weed onto the floating support.

In witness that I claim the foregoing I have hereunto subscribed my name this 29th day of November 1912.

GEO. H. ENNIS.

Witnesses:
BEULAH M. ROBARGE,
ELWOOD H. BARKELEW.

---

Correction in Letters Patent No. 1,080,144.

It is hereby certified that in Letters Patent No. 1,080,144, granted December 2, 1913, upon the application of George H. Ennis, of Los Angeles, California, for an improvement in "Seaweed-Harvesters," an error appears in the printed specification requiring correction as follows: Page 4, line 104, strike out the words "port to the horizontal cutter, means acting" and insert the words, comma, and syllable *from the float, cutters at the for-;* and that the said Letters Patent should be read with this corrrection therein that the same may conform to the record of the case in the Patent Office.

Signed and sealed this 16th day of February, A. D., 1915.

[SEAL.]

J. T. NEWTON,

*Acting Commissioner of Patents.* ters at the forward end of said tunnel at each side and at the bottom of said tunnel, and conveyer means operating at the forward end of said tunnel rearward of the cutters to lift cut sea weed onto the floating support.

18. Apparatus for harvesting sea weed and the like, comprising a floating support, floating guides at the forward end of the support, pivotal connecting means between the guides and support, vertical cutters at the forward ends of the floating guides, a horizontal cutter at the rear lower edges of the floating guides, and means for lifting the cut sea weed onto the floating support.

In witness that I claim the foregoing I have hereunto subscribed my name this 29th day of November 1912.

GEO. H. ENNIS.

Witnesses:
BEULAH M. ROBARGE,
ELWOOD H. BARKELEW.

---

Correction in Letters Patent No. 1,080,144.

It is hereby certified that in Letters Patent No. 1,080,144, granted December 2, 1913, upon the application of George H. Ennis, of Los Angeles, California, for an improvement in "Seaweed-Harvesters," an error appears in the printed specification requiring correction as follows: Page 4, line 104, strike out the words "port to the horizontal cutter, means acting" and insert the words, comma, and syllable *from the float, cutters at the for-;* and that the said Letters Patent should be read with this corrrection therein that the same may conform to the record of the case in the Patent Office.

Signed and sealed this 16th day of February, A. D., 1915.

[SEAL.]

J. T. NEWTON,

*Acting Commissioner of Patents.*

Correction in Letters Patent No. 1,080,144.

It is hereby certified that in Letters Patent No. 1,080,144, granted December 2, 1913, upon the application of George H. Ennis, of Los Angeles, California, for an improvement in "Seaweed-Harvesters," an error appears in the printed specification requiring correction as follows: Page 4, line 104, strike out the words "port to the horizontal cutter, means acting" and insert the words, comma, and syllable *from the float, cutters at the for-;* and that the said Letters Patent should be read with this corrrection therein that the same may conform to the record of the case in the Patent Office.

Signed and sealed this 16th day of February, A. D., 1915.

[SEAL.]
J. T. NEWTON,

*Acting Commissioner of Patents.*